United States Patent Office.

THOMAS R. ABBOTT, OF LOWELL, MASSACHUSETTS.

Letters Patent No. 99,277, dated February 1, 1870.

IMPROVED ROOFING-COMPOSITION.

The Schedule referred to in these Letters Patent and making part of the same.

*To all whom it may concern:*

Be it known that I, THOMAS R. ABBOTT, of Lowell, in the county of Middlesex, and State of Massachusetts, have invented certain new and useful Improvements in Composition for Roofing, of which the following is a full, clear, and exact description.

My said invention and improvements in composition for roofing relate to that kind of compounds which is used in a plastic state, and applied with a trowel or other suitable instrument.

The ingredients of which I make my improved roofing-composition, are petroleum, rosin or pitch, and silica, mixed together by first heating the petroleum sufficiently to dissolve the rosin, and then by adding and stirring in the silica, in quantity to make a thick paste, say about the consistency of mortar used for laying brick.

The composition thus made, is evenly spread upon the previously-prepared roof, from one-fourth to three-eighths of an inch in thickness, and this is done while hot or warm, or it may be done by heating the spreading-instrument.

In mixing my improved roofing-composition, I place any desired quantity of the petroleum into a suitable kettle, say about half its holding-capacity, and apply heat in any convenient way, and continue the heat until the temperature of the petroleum is raised to nearly a boiling-point. I then add rosin or pitch, and continue the heat until the quantity of rosin or pitch dissolved in the petroleum, makes the whole mass about the consistency of molasses or thin, fine tar.

It is somewhat difficult to give the precise quantity of each of the last-named ingredients, or the exact proportions, since petroleum varies in density, and each different lot will generally dissolve a different quantity of rosin or pitch, and if the latter is used, a greater quantity of it is soluble in petroleum than of the former; and, therefore, I find that by dissolving and mixing the rosin or the pitch with the petroleum until the proper consistency is attained, I produce a mixture best fitted to receive the silica, which, if lumpy, should be rubbed through a sieve into the previously-prepared mixture, and stirred until all the parts are thoroughly incorporated. The silica should be well dried before being sifted into the mixture.

Various grades of silica are found in most of the New England States, and some of the silica has sand and other similar substances with it when found in the bank or bed; but if not more than one-half of the bulk of the silica is sand or other sharp, gritty substance, I have found it to be sufficiently pure for roofing-purposes, but I prefer that silica which is comparatively free from impurities.

Silica, as I have found it in the bank or bed, may be easily distinguished from sand, or other substances, by its sharpness and roughness, some of the particles being pointed, and others having rough, shelly sides, while sand is smooth, round, or oblong particles.

Most of the silica is in very elongated particles, many of them from ten to fifty or more diameters or cross-sections in length, and therefore much better adapted for roofing-composition than any of the ground or pulverized substances, especially when combined with the proper mixture of petroleum and rosin or pitch.

If combined with coal-tar, or other substances which have little or no adhesive properties, I consider it no better than many other roofing-compositions. I find that there must be considerable tenacity and strength to the retaining-mixture, or the composition will be faulty and easily affected by expansion and contraction.

The advantages to be derived from the use of silica, with petroleum and rosin or pitch, in a roofing-composition, whether free from impurities, or having mixed therewith sharp, gritty substances found in their natural state, are as follows:

First, the silica is insoluble and incombustible.

Second, it requires no grinding.

Third, the form, structure, and natural condition of each particle of silica are such, that when combined with a tough, adhesive substance, like petroleum and rosin or pitch properly incorporated, it makes a very tough, strong, and durable covering for roofs—a composition which has little or no expanding or contracting-properties, and is therefore not liable to crack in cold, or to assimilate a liquid form in very hot weather.

Each particle of the silica, when magnified about four hundred diameters, is found to be elongated, as before described, and some of the particles are apparently smooth, while others are pointed, shelly structures, somewhat resembling miniature ears of corn.

Each of the elongated and rough, shelly particles of silica, when embedded in the tough, adhesive composition of petroleum and rosin or pitch, performs a very important office of holding to the composition, or of rendering it still more adhesive in itself, that is, much more tenacious, tough, and of much greater strength to resist the expanding and contracting-action, or that force exerted by the roof-boards, on which such composition is spread, like hair in plastering-mortar, or like straw in tubular dry sand-cores for casting metal pipes of large size.

No substance which has to be ground or reduced to fineness, by stamping or pounding, can be reasonably expected to form so good and durable roofing-composition as that substance which, in its natural state, is composed of rough, elongated particles like silica, which particles lap over and interlace each other, and are firmly held by the tough, adhesive mixture of petroleum and rosin or pitch, and no mixture with which I am acquainted, is so efficient as that last named for holding such elongated, rough particles together.

Pulverized soapstone, and talc, its equivalent, have been combined with rosin and petroleum, as described in the patent to Libby and Stimson, August 3, 1869; and I am aware that coal-tar and silica have been used in combination for a roofing-composition. The former patent I have recently purchased, as by deed from said Libby and Stimson to me, dated      1869, and recorded in Liber C$^{12}$, page 339 of Transfers of Patents; but neither of the above-described compositions is found to possess the necessary properties and qualities to render it in any sense the equal or equivalent to the composition which I have described as my invention, and therefore I disclaim having invented the equivalent, in principle or otherwise, of either of the last above-named compositions; but What I do claim as my invention, and desire to secure by Letters Patent, is—

The composition of petroleum, rosin or pitch, and silica, or any analogous substance, when used in its natural state, without grinding, or otherwise mechanically reducing to fineness, except by sifting, as herein described, said ingredients being combined and used substantially as and for the purpose specified.

THOS. R. ABBOTT.

Witnesses:
JOHN E. CRANE,
J. S. WHITSIZ.